(12) United States Patent
Donaldson et al.

(10) Patent No.: US 6,374,223 B1
(45) Date of Patent: Apr. 16, 2002

(54) INTERNET TO VOICE MAIL MESSAGING

(75) Inventors: Dustin Donaldson, Fremont; Douglas A. Sabella, Saratoga, both of CA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/330,392

(22) Filed: Jun. 11, 1999

(51) Int. Cl.[7] .................... G10L 13/08; G10L 21/06
(52) U.S. Cl. ................. 704/260; 704/270; 704/271; 704/275
(58) Field of Search .................... 704/235, 260, 704/270, 275, 271

(56) References Cited

U.S. PATENT DOCUMENTS

| | | | | |
|---|---|---|---|---|
| 5,555,343 A | * | 9/1996 | Luther | 704/260 |
| 5,559,859 A | * | 9/1996 | Dai et al. | 348/449 |
| 5,832,223 A | * | 11/1998 | Hara et al. | 429/314 |
| 5,845,211 A | * | 12/1998 | Roach, Jr. | 455/466 |
| 5,966,663 A | * | 10/1999 | Gleason | 455/466 |
| 6,018,710 A | * | 1/2000 | Wynblatt et al. | 704/260 |
| 6,122,614 A | * | 9/2000 | Kahn et al. | 704/260 |

OTHER PUBLICATIONS

Text Assist User's Guide (Creative Labs, © 1994).*

* cited by examiner

*Primary Examiner*—Richemond Dorvil
*Assistant Examiner*—Daniel A. Nolan
(74) *Attorney, Agent, or Firm*—Haverstock & Owens LLP

(57) ABSTRACT

A method of and apparatus for Internet voice mail messaging allows for automatic retrieval of information from the Internet, text to digital speech conversion of the information, if necessary, conversion of the digital speech information from digital format to a proprietary digital voice signal, if necessary and transfer of such information to various users through conventional telephonic voice messaging systems. The method and apparatus automatically accesses the Internet, downloads the information to be retrieved, converts the information from a digital format to a proprietary digital voice signal, transmits the converted information to a dedicated telephonic voice messaging system, and instructs the dedicated telephonic voice messaging system to transmit the information to the voice mail boxes of various selected users. The users may be users specific to the dedicated telephonic voice messaging system or users of other voice messaging systems which are networked with the dedicated telephonic voice messaging system through a conventional voice mail network over standard public service telephone network lines or digital link, either of which may use proprietary protocols.

18 Claims, 2 Drawing Sheets

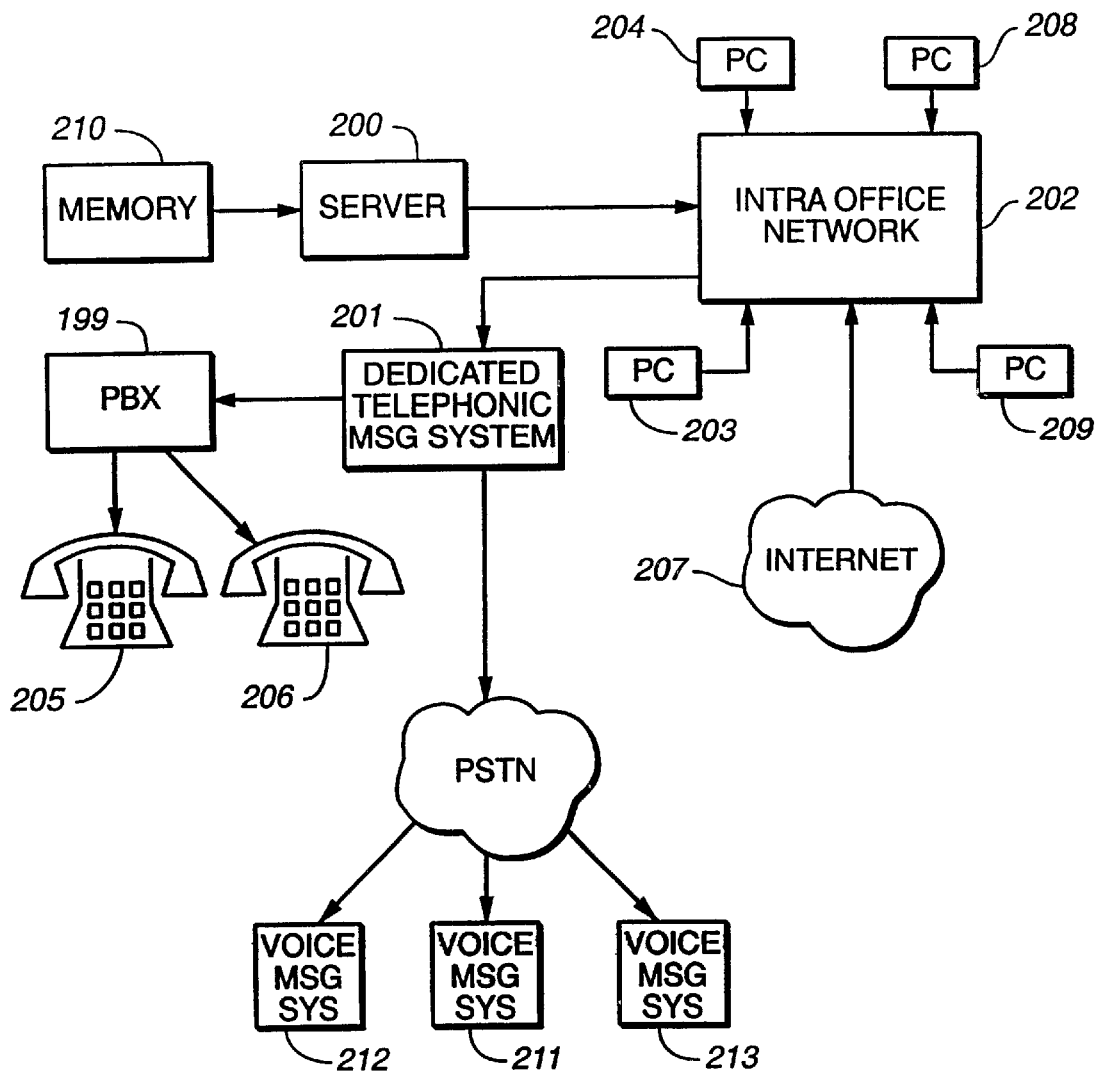
FIG._1

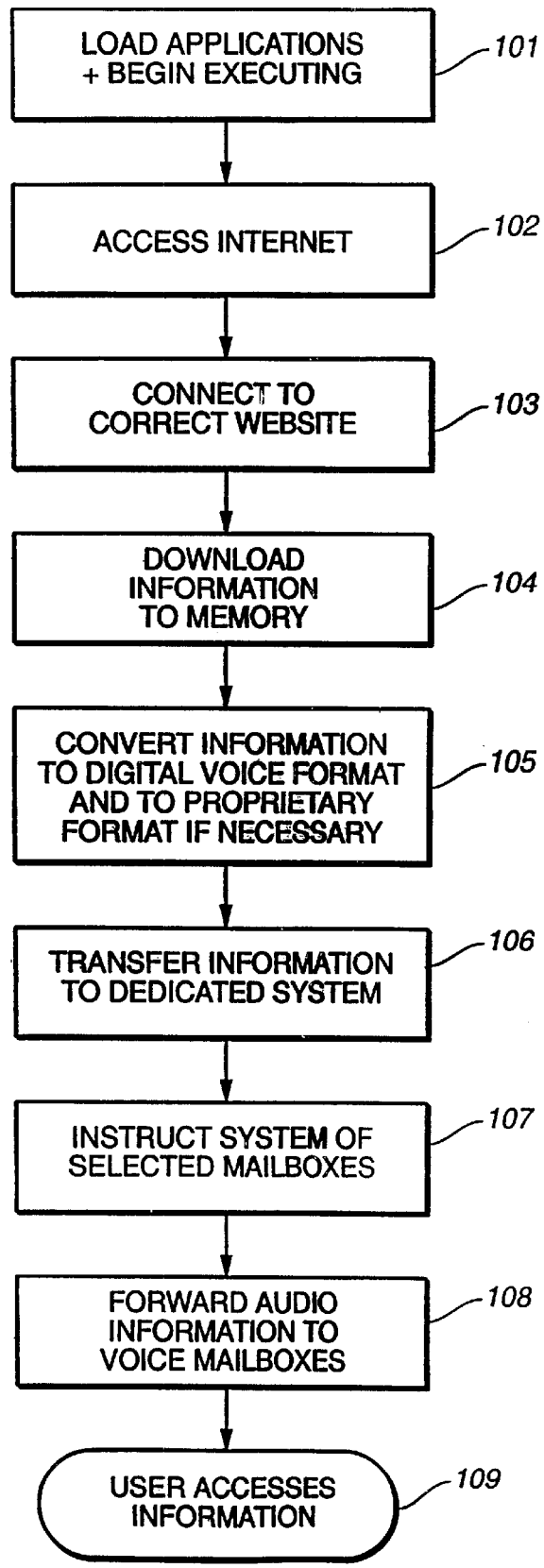
FIG._2

INTERNET TO VOICE MAIL MESSAGING

FIELD OF THE INVENTION

The present invention pertains to the field of telephonic voice mail messaging. More particularly, the present invention relates to a method of and apparatus for retrieving information from the Internet and for textual information, converting the information into a digital voice file for wide scale distribution over a telephonic voice mail messaging network.

BACKGROUND OF THE INVENTION

Telephonic voice mail messaging systems are well known in the art and allow a user of the telephonic voice mail messaging system to record and retrieve messages over an analog telephonic voice line. In a typical telephonic voice mail messaging system, the user is assigned a voice mail box and an individual passcode which is typically entered using the key pad of a telephone. When using an assigned telephone which is directly connected to the telephonic voice mail messaging system, the user can generally access the telephonic voice mail messaging system by simply entering his or her mail box number or passcode. Alternatively, a user may access the telephonic voice mail messaging system from an external or "outside" telephone by dialing into the system from the external telephone and then entering his or her mailbox number and passcode. Once connected to the telephonic voice mail messaging system, a user may access his or her voice mail box in order to listen to, record and delete messages. More sophisticated voice mail messaging systems allow a user to send copies of messages from his or her voice mail box to the voice mail box of another user of the system. For example, this may occur if the user has gotten a telephonic voice mail message regarding a meeting date or time and wishes to forward the information on to a third party who will also be attending the meeting.

Additionally, some systems allow a user to send a voice mail message out to a group of persons by designing a customized list and directing the voice mail messaging system to send the voice mail message out to all persons on the list. For example, if the user is a member of a product sales group and he or she receives a message regarding a target production release date for a new product line, he or she may wish to forward the message to all members of the sales group. It is understood that telephonic voice mail messaging systems are designed with specific protocols. However, multiple telephonic voice mail messaging systems may be interconnected through an established voice mail network over standard public switched telephone network (PSTN) phone lines. The voice mail networks could also be coupled together over a digital network. The voice mail networks typically communicate with proprietary protocols. The use of an interchange allows multiple telephonic voice mail messaging systems which use different protocols to communicate with each other.

Currently, however, a user must perform all messaging functions manually from a telephone set by entering a predetermined series of keystrokes on the telephone key pad. If a user receives voice mail messages daily and wishes to provide these messages to a number of persons on a daily basis, the user is required to manually perform such an operation each time, e.g., on a daily basis. In a voice mail network having multiple telephonic voice mail messaging systems, this process can be time consuming and may require a user to expend precious time forwarding messages rather than working productively.

The interconnection of individual PCs and workstations configured in an office network to the Internet has become increasingly popular. Everyday, thousands of people rely upon the Internet to find information about various people, places and things. For example, the Internet allows users to gain a wide array of information ranging from stock price quotes to product line information, all from their PC within a matter of minutes.

An Internet search engine is an Internet service which automates a search over the Internet. For example, a user wishing to access information about a technique for blowing glass may utilize a search engine. The search engine will automatically retrieve a list of Internet web sites pertaining to the specialized topic (i.e. glass blowing). The user can then check out each web site individually, often through the use of a hyperlink which allows the user to jump directly to the relevant web site.

Some Internet search engines will create customized user pages. Yahoo™ is one such search engine. Using a service known as "My Yahoo", a user who frequently accesses certain information, such as sports pages for scores of recent sporting events and/or stock quote pricing pages, may be able to create a customized web page which contains all of the relevant information he or she wishes to access. This service eliminates the need for the user to jump from web site to web site and allows all of the regularly accessed information to be viewed at the simple click of a mouse button.

However, since the advent of the Internet, millions of users have had to take time out of their busy day to gain access to a computer terminal in order to access such information from the Internet. While many Internet search engines, such as Yahoo™, will allow users to set up customized web pages, users with extremely busy schedules which may require them to travel extensively or spend a great deal of time on the road may not be able to get access to a computer until they return to the office at the end of the day. Accordingly, they cannot take time out of their busy day to log onto the Internet to check stock prices or find information about various products and/or services offered from vendors around the world until late in the day. As a result of which, a user may often miss important messages or vital information.

One solution to this problem has been the use of laptop or lightweight personal computers which are specifically designed for use by persons who may travel extensively but still require access to a computer terminal. Typically, these laptop or lightweight personal computers are equipped with a modem and communications card which allow users to dial in through any local phone line in order to gain access to the Internet. However, these laptop or lightweight personal computers may often be quite expensive and/or are often cumbersome to carry around at all times. Additionally, a user must still take time out of his busy schedule to set up his computer terminal, dial into his or her Internet connection service provider, and log onto the Internet. As a result, many users are reluctant to carry around a laptop and are not afforded the convenience of being able to log onto the Internet at any time.

Another solution has been the use of automated paging alert systems for notification of important e-mail messages. In such systems, a user e-mail account is coordinated for use with an individual paging system such that the user will receive a page whenever an important e-mail message is received, thereby notifying the user of the e-mail message at the time it is received. However, this solution is not ideal due to several inherent problems. The first and most obvious being the fact that such a solution is limited to e-mail applications and cannot support the wide array of global information available over the Internet which the user may be interested in accessing. The second draw back to such a solution is that this solution still requires a user to gain access to a computer terminal and modem in order to check his or her e-mail account.

What is needed is a device which allows digital Internet information to be retrieved, converted to a voice mail message, and stored in a user's voice mailbox for remote retrieval. This way, the user can access the information from anywhere in the world by simply dialing into his or her voice mail system and retrieving the information from his or her voice mailbox. What is further needed is a device which allows such voice mail messages to be automatically distributed to multiple users on a wide scale distribution basis without requiring a user to manually perform the message transfer operation.

SUMMARY OF THE INVENTION

A method and apparatus for automatically accessing information such as an e-mail message from the Internet and downloading the information to a voice mailbox for retrieval over a voice mail messaging system. The method and apparatus accesses the Internet and downloads the information to be retrieved. The method and apparatus then performs a text-to-speech conversion, if necessary, on the information, to form a digital audio file, which can be stored in a voice mail box and later retrieved by the user. Preferably, the system first forms a digital audio file. If necessary, the digital audio file is then further converted to a proprietary digital format and transmitted to a dedicated telephonic voice messaging system. Typically, but not necessarily, the type of digital audio file is proprietary to the manufacturer of the voice mail system. The dedicated telephonic voice messaging system may be a customized system or a previously in-use system which has been configured to enable the system to communicate properly with the apparatus of the present invention. The method and apparatus of the present invention then instructs the dedicated telephonic voice messaging system to transmit the information to the voice mailbox of the selected user or several users. In this way, a user can listen to the received message. The users may be users specific to the dedicated telephonic voice messaging system or users of other voice messaging systems which are networked with the dedicated telephonic voice messaging system through a conventional voice mail network which is established over the PSTN lines or digital link. This voice mail network may or may not use proprietary protocols.

BRIEF DESCRIPTION OF THE DRAWINGS

FIG. 1 shows a block diagram for the preferred embodiment of the present invention.

FIG. 2 shows a flow chart for implementing the method of the present invention.

DETAILED DESCRIPTION OF THE PREFERRED EMBODIMENT

A method and apparatus for Internet voice messaging allows for automatic retrieval of information such as an e-mail message from the Internet and transfer of the information as a voice mail message to multiple users in a voice mail network. The apparatus includes an access server which automatically accesses the Internet and retrieves specified digital textual information from the Internet. It will be apparent to those of ordinary skill in the art that the necessary hardware and control software for performing these functions can physically reside in the access server, the voice mail server or any other digital equipment which is logically coupled to the voice mail system. The information is downloaded to the access server and a text-to-speech conversion of the information is performed, if necessary, to form an audible signal the user can hear. Preferably the system first forms a digital audio wave (.wav) file. The digital audio wave (.wav) file may then converted from the digital audio wave (.wav) file to a proprietary digital audio file format depending upon the type of dedicated voice mail system and transferred to the voice mail boxes of a selected user or users through a dedicated telephonic voice mail messaging system which is coupled to the access server. The method and apparatus of the present invention transfers the information to the dedicated telephonic voice mail messaging system and then instructs the dedicated telephonic voice mail messaging system to transmit the information to the voice mailboxes of various selected user(s). Each user may be a user specific to the dedicated telephonic voice mail messaging system or a user of other voice mail messaging systems which are networked with the dedicated telephonic voice mail messaging system through a conventional voice mail network which is established over the PSTN lines or digital link, either of which may use a proprietary protocol.

The apparatus of the present invention includes an access server configured for connecting between the Internet and the dedicated voice mail messaging system which is coupled to the access server. The access server software preferably runs on a Windows NT 4.0 server capable of connecting to the Internet through any ISDN, digital subscriber line (xDSL), or a high speed digital subscriber line (HDSL). Alternatively, the access server may be configured for operating directly as an Internet server and connecting directly to the backbone of the Internet through a high speed digital bus line, such as a T1 bus. In such an alternative configuration, the access server is always actively connected to the Internet and no intermediary ISP connection is required. The dedicated telephonic voice mail messaging system is configured for coupling with the access server and includes a customized digital interface network card and proprietary software for communicating with the access server.

Multiple voice mail messaging systems may be coupled to the dedicated voice mail messaging system through the PSTN phones lines or digital link, thereby forming a voice mail network such that a user of the dedicated voice mail messaging system can transfer messages to users of any of the other voice mail messaging systems through the PSTN phone lines or digital link. While each voice mail messaging system may have its own protocol, the systems are capable of communicating with each other through the use of a common standard protocol an interchange which is well known in the art.

The access server includes customized software which allows a system operator to design program applications which can automatically access the Internet, retrieve desired information including e-mail messages from various locations, download the information to the server, convert the information from a digital format to a proprietary digital format, transfer the information to the dedicated voice mail messaging system and instruct the dedicated voice mail messaging system to transfer the information to one or more selected voice mailboxes for users of the dedicated voice mail messaging system, as well as users of other voice mail messaging systems which may be connected to the dedicated voice mail messaging system through an established voice mail network over the PSTN phone lines or digital link. The information is then transferred to the various voice mailboxes for the designated users, in an appropriate protocol which is recognizable by the respective voice mail messaging system, such that the user receives an audible voice mail message of the desired information within their individual voice mailbox.

FIG. 1 shows a block diagram for the preferred embodiment of the present invention. A server 200 is coupled to an intraoffice network (Intranet) 202. This intraoffice network 202 may be a local area network (LAN) or some other configuration, such as a wide area network (WAN) or Ethernet network. A number of PCs or terminals 203, 204, 208 and 209 are also coupled to the intraoffice network 202. It is understood that the intraoffice network structure and functionality, as well as the number of PCs or terminals coupled to the Intranet is ancillary to the invention. The intraoffice network 202 is further coupled to the Internet 207, allowing all of the computers on the Intranet to access the Internet. The connection between the interoffice network and the Internet may be established over an ISDN line, dedicated digital subscriber line (xDSL), or a high speed digital subscriber lines (HDSL), or may be established through conventional PSTN phone lines via a modem. The size and exact configuration of the intraoffice network may vary so long as the Intranet is, in fact, coupled to provide access to the Internet.

In an alternate embodiment, the server 200 may be configured for coupling directly to it the Internet. This may be done through a dedicated digital subscriber line with an Internet Service Provider (ISP) or, alternatively, the server 200 may have its own direct Internet address/domain name and may be connected directly to the backbone of the Internet through a high speed digital bus, such as a T1 digital bus line.

A dedicated telephonic messaging system 201 is coupled to the server 200 via the LAN 202. In the preferred embodiment, a number of telephone sets 205 and 206 are preferably coupled to the dedicated telephonic messaging system 201 through a PBX 199 as shown or alternatively through the Central Office. It is understood that the number of telephone sets coupled to the dedicated telephonic messaging system 201 may vary depending upon the system capabilities. A number of different telephonic voice messaging systems 211, 212 and 213 are interconnected to the dedicated telephonic messaging system 201 through an existing voice mail network over existing PSTN lines or digital link. In an alternative embodiment, no telephone sets may be coupled to the dedicated telephonic messaging system 201, and it may serve exclusively as a messaging port for delivering telephonic audio messages to the other telephonic voice messaging systems 211, 212, and 213 which are interconnected with the dedicated telephonic messaging system through an established voice mail network over existing PSTN lines or digital link.

The server 200 is configured for performing specialized application programs which allow the server to automatically access the Internet and download information from the Internet. The information is preferably stored in a memory 210 of the server 200. Alternatively, the server may store the information in a memory 210 which is external to the server 200, such as a memory in an external CPU. It is understood that the information downloaded from the Internet and stored in the memory 210 is digitally formatted information. The server 200 then retrieves the information from the memory 210 and performs a text-to-speech conversion, if necessary, on the digital information to allow the user to listen to the information from any telephone. To perform the text-to-speech conversion, the system preferably first forms a digital audio wave (.wav) file. This digital audio wave (.wav) file represents a digital audio signal. If necessary, the server 200 further converts the digital audio wave (.wav) file from the digital audio signal format to a proprietary digital audio signal format for transmission. This proprietary digital voice signal format can be recognized by the dedicated telephone messaging system 201. The converted information is then transferred to the dedicated telephone messaging system 201, and the server 200 directs the dedicated telephone messaging system 201 to transfer the information to the voice mailboxes of various users. These voice mailboxes may be contained directly in the dedicated telephone messaging system 201, or they may be contained in the other messaging systems 211, 212 and 213 which are interconnected with the dedicated messaging system 201 through an existing voice mail network established over the PSTN phone lines or digital link.

Each voice mailbox has its own distinct address within a telephonic voice messaging system. Moreover, in the case of a voice mail network, each voice messaging system has its own precursor identifier. Accordingly, the server 200 sends this address and precursor identifier information to the dedicated voice messaging system 201 for each voice mailbox where the information, now in the form of a proprietary digital voice signal, is to be stored. The information is then forward onto the designated voice mailboxes, in the proper format recognized by their particular voice messaging system, and stored in the voice mailboxes. A user can then access the information by simply checking their voice mailbox and retrieving the information which has been stored therein in the form of a voice mail message.

FIG. 2 shows a flow chart for implementing the method of the present invention. Initially, an access server (FIG. 1) will load the application program to be executed (Step 101). It understood that the specifics of the application program may vary; although, generally, the application program specifies the information to be retrieved from various Internet webs sites and the voice mail box locations where the information is to be eventually delivered. In executing the application program, the access server (FIG. 1) will access the Internet (Step 102) preferably automatically. Preferably, this is done by dialing through an Internet Service Provider (ISP) over an integrated services digital network (ISDN) line or digital subscriber line. Alternatively, the access server (FIG. 1) may have its own direct Internet address/domain name and may be connected directly to the backbone of the Internet through a high speed digital bus, such as a T1 digital bus line. In this case, the server is always actively connected to the Internet and no additional connection is required.

Once a connection with the Internet has been established, the access server (FIG. 1) will find the information to be retrieved by programmatically accessing the correct Internet web site (Step 103). Once the access server (FIG. 1) has found the correct Internet web site from which the information is to be retrieved, the access server then downloads the specified information from the correct Internet web site to a memory (FIG. 1) in the server (Step 104). Alternatively, the memory (FIG. 1) may be configured external to the server, such as in a dedicated CPU coupled to the server. It is understood that the information is downloaded from the Internet in its original digital format. After all of the specified information has been downloaded, the access server may disconnect from the Internet. As described earlier, in a case where the server is actually connected to the backbone of the Internet through a high speed digital bus, such as a T1 line, the server is always actively connected to the Internet and will not disconnect.

Once the retrieval process has been completed, the information is first converted from text-to-speech, if necessary, so that the user can listen to the information. To perform the conversion operation the system first generates a digital audio wave (.wav) file. The digital audio wave (.wav) file is then converted to a proprietary digital format, if necessary (Step 105). The information, which has now been converted to a proprietary digital format signal, is then transferred to a dedicated voice mail messaging system (FIG. 1) configured for communicating with the server (Step 106). The dedicated voice mail messaging system (FIG. 1) is also configured with a message memory for storing the information. The access server then issues instructions to the dedicated voice mail messaging system, directing it to send the information to each selected voice mailbox (Step 107). A voice mailbox is not a physical item; but, rather, a dedicated portion of a memory within a voice mail messaging system which has been allocated for the exclusive use of a specific user of the system. Depending upon the memory size and the number of users to the voice mail messaging system, the voice mailbox size and capability may vary. In the present invention, the voice mailboxes where the information is to be stored may belong to users of the dedicated voice mail messaging system or may be voice mailboxes in other telephonic voice mail messaging systems which are coupled to the dedicated voice messaging system through an established voice mail network over the conventional PSTN phone lines or digital link.

Each voice mailbox has its own distinct address within a telephonic voice mail messaging system. Moreover, in the case of a voice mail network, each voice mail messaging system has its own precursor identifier. Accordingly, the server sends this address and precursor identifier information to the dedicated voice messaging system for each voice mailbox where the information is to be sent. The information, now in the form of an analog format telephone voice signal, will then be forward onto the designated voice mailboxes of each of the users, in the proper format recognized by their particular voice messaging system, and stored in each of the individual voice mailboxes (Step 108). A user can than access the information by simply checking his or her voice mailbox and retrieving the information which has been stored therein in the form of a voice mail message (Step 109).

In an alternative embodiment, the method of the present invention may be used to access information from any computer coupled to a local area network (LAN). Referring once again to FIG. 1, in this alternative embodiment, the access server 200 is coupled to the LAN 202. As shown, a number of computers 203, 204, 208 and 209 are all coupled to, and along with the server 200 make up, the LAN 202. Each one of these computers 203, 204, 208 and 209 has a specified node address on the LAN so that each may transmit information back and forth over the LAN. In much the same way as previously described, the access server 200 initially accesses digital information from one of the computers 203, 204, 208 or 209 coupled to the LAN 202 by specifying the node address of the computer and the memory address within the computer where the information is to be retrieved. The information is downloaded from the computer, through the LAN, and stored in a memory 210 of the access server 200. It is understood that this information is also in its original digital format. Once the information has been completely downloaded, a text-to-speech conversion is performed, if necessary, and preferably first generates a digital audio wave (.wav) file. This digital audio wave file is further converted from a digital signal format to a proprietary digital format. The information, now in the form of a proprietary digital voice signal, will then be forward onto the designated voice mailboxes of each of the users specified by the application program, in the proper format recognized by their particular voice messaging system, and stored in each of these users individual voice mailboxes (Step 108). Each of the specified users can then access the information by simply checking his or her voice mailbox and retrieving the information which has been stored therein in the form of a voice mail message.

Several illustrative examples shall be provided herein in order to better explain the functions of the present invention.

EXAMPLE 1

Company A has approximately 500 employees. These employees are located in San Francisco, Los Angeles and Washington D.C. Each of these locations has a separate voice mail messaging system for all employees at that location. However, the separate voice mail messaging systems can communicate with each such that an employee in Los Angeles can forward a copy of a telephone message onward to an employee in the Washington D.C. office. Assume that a large number of the employees own stock in Company A and would like to regularly find out the stock price for Company A stock. Prior art would require one of the employees to get the information on the stock price (preferably from the Internet) and send a copy of the information to all interested employees through an interoffice memorandum or electronic mail. Now, let us assume that a large number of the employees who own stock in Company A spend many hours traveling as a result of their profession and do not always receive these memorandum or electronic mail messages in a timely manner. Utilizing the method and apparatus of the present invention, a system operator can design an application program instructing the server to automatically access the stock price of Company A stock from the Internet on a weekly, daily or hourly basis. The application program can also be set up to download the information to the server, convert the information to a proprietary formatted analog telephone signal and transfer the information to the dedicated telephonic messaging system. Finally, the application program can be designed such that the server will instruct the dedicated messaging system to transfer a copy of the proprietary digital audio file to the voice mail box of every interested employee. This way, if an employee wishes to check the stock price for Company A stock, he or she need only dial into his or her telephone voice mail box and retrieve the stock price.

EXAMPLE 2

Company B has approximately 2000 employees. These employees are located in San Francisco, Los Angeles and Washington D.C. Each of these locations has a separate voice mail messaging system for all employees at that location. However, the separate voice mail messaging systems can communicate with each such that an employee in Los Angeles can forward a copy of a telephone message onward to an employee in the Washington D.C. office. Assume that a large number of employees in Company B utilize a direct deposit paycheck feature, by which their weekly earnings are automatically deposited into a designated account. Assume also, that these employees would like to regularly find out exactly how much has been deposited to their account after each pay period. Prior art would ordinarily require a written statement be issued to the employee at the end of the pay period, informing him/her of the earnings, deductions and total amount deposited for the pay period in question. However, by utilizing the method and apparatus of the present invention, a system operator can design an application program instructing the server to automatically access the financial records of Company B from a central computer which is connected to a local area network. Utilizing such a custom program, the access server can download the payroll information from the central computer and distribute the information to each user, leaving a voice mail message indicating the user's weekly earnings, deductions and net pay deposited into their individual account.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that the examples provided above are for illustration purposes only and the present invention may be used to perform various Internet messaging tasks. Additionally, modifications may be made in the embodiments chosen for illustration without departing from the spirit and scope of the invention. Specifically, it will be apparent to one of ordinary skill in the art that the apparatus of the present invention could be implemented in several different ways and the method disclosed above may include additional steps.

What is claimed is:

1. A method of retrieving digital information from the Internet and providing it as an audio message comprising the steps of:
   a. retrieving the digital information from the Internet:
   b. performing a text-to-speech conversion on the digital information to form a digital audio file;
   c. converting the digital audio file to a proprietary digital audio file appropriately formatted to a dedicated telephone voice mail messaging system; and
   d. storing the proprietary digital audio file as a voice mail message in a mailbox of a voice mail system.

2. The method according to claim 1 further comprising the steps of:
   a. receiving a user request for the voice mail message; and
   b. playing the voice mail message to the user.

3. The method according to claim 1 wherein the digital audio file is a wave file (.wav).

4. A system for retrieving digital information from the Internet and providing it as an audio message comprising the steps of:
   a. means for retrieving the digital information from the Internet:
   b. means for performing a text-to-speech conversion on the digital information to form a digital audio file;
   c. means for converting the digital audio file to a proprietary digital audio file appropriately formatted to a dedicated telephone voice mail messaging system; and
   d. means for storing the proprietary digital audio file as a voice mail message in a mailbox of a voice mail system.

5. The system according to claim 4 further comprising:
   a. means for receiving a user request for the voice mail message; and
   b. means for playing the voice mail message to the user.

6. The system according to claim 4 wherein the digital audio file is a wave file (.wav).

7. A method of automatically sending textual information from the Internet as a voice mail message to various users of a telephonic voice mail messaging system comprising the steps of:
   a. automatically accessing the Internet through a server;
   b. downloading the textual information from the Internet to the server;
   c. performing a digital text-to-speech conversion on the textual information, thereby creating a digital audio file;
   d. converting the digital audio file from a digital format to a proprietary digital voice
   e. transferring the proprietary digital voice file to a dedicated telephonic voice mail system; and
   f. instructing the dedicated telephonic voice mail system to distribute the proprietary digital audio signal to voice mailboxes belonging to various users of the system.

8. The method of automatically sending textual information from the Internet, as claimed in claim 7, including the additional step of:
   g. instructing the dedicated telephonic voice mail system to transfer the proprietary digital audio signal to other telephonic voice mail systems which may be coupled to the dedicated telephonic voice mail system over a voice mail network for distribution to various users of the other telephonic voice mail systems.

9. A method of automatically sending textual information from the Internet as a voice mail message to various users of a voice mail system having multiple voice mailboxes, comprising the steps of:
   a. automatically accessing the Internet through a server;
   b. downloading the textual information from the Internet to the server;
   c. performing a text-to-speech conversion on the on the textual information, thereby creating a digital audio file;
   d. converting the digital audio file from a digital format to a proprietary digital voice file;
   e. transferring the proprietary digital voice file to a dedicated telephonic voice mail system; and
   f. instructing the dedicated telephonic voice mail system to distribute the proprietary digital voice file to voice mailboxes of various users of the system; and
   g. directing the dedicated telephonic voice mail system to transfer the information to other telephonic voice mail systems which may be coupled to the dedicated telephonic voice mail system for distribution to voice mailboxes belonging to various users of the other telephonic voice mail systems.

10. A method of automatically sending textual information from any computer connected to an interoffice network, such as a local area network (LAN) or wide area network (WAN), to the voice mailboxes of various users in a voice mail system comprising the steps of:
   a. accessing the computer connected to the interoffice network through a server coupled to the interoffice network;
   b. downloading the textual information from the computer to the server;
   c. performing a text-to-speech conversion on the textual information, thereby creating a digital audio file;
   d. converting the digital audio file from a digital format to a proprietary digital voice file appropriately formatted to a dedicated telephone voice mail messaging system;

e. transferring the proprietary digital audio file to a dedicated telephonic voice mail system; and f. instructing the dedicated telephonic voice mail system to distribute proprietary digital audio file to various voice mailboxes belonging to users of the system.

11. The method of automatically sending information from any computer connected to an interoffice network, as claimed in claim 10, which includes the further step of:

f. instructing the dedicated telephonic voice mail system to transfer the digital audio file to other telephonic voice mail systems which may be coupled to the dedicated telephonic voice mail system for distribution to voice mailboxes belonging to various users of the other telephonic voice mail systems.

12. An apparatus for automatically accessing digital information from the Internet, converting the information to a digital voice signal, and distributing the digital voice signal as a voice mail message to a number of individual voice mailboxes, comprising:

a. means for accessing the Internet and downloading digital information from the Internet;

b. means for storing the digital information coupled to the means for accessing;

c. means for converting the digital information to a digital voice signal coupled to the means for storing;

d. means for converting the digital voice file from a digital format to a proprietary digital voice file appropriately formatted to a dedicated telephone voice mail messaging system; and e. a means for distributing the proprietary digital voice signal as a voice mail message to a number of individual voice mail boxes, wherein said means for distributing the digital voice signal is coupled to the means for converting the digital voice file to a proprietary digital voice file.

13. The apparatus for automatically accessing digital information from the Internet, as claimed in claim 12, wherein the means for accessing the Internet is a server.

14. The apparatus for automatically accessing digital information from the Internet, as claimed in claim 13, wherein the means for storing the digital information is a memory coupled to the server.

15. The apparatus for automatically accessing digital information from the Internet, as claimed in claim 12, wherein the means for distributing the digital voice signal as a voice mail message to a number of individual voice mail boxes includes a dedicated voice mail messaging system.

16. An Internet voice messaging apparatus for automatically accessing digital information from the Internet, converting the digital information to a digital voice signal, and distributing the digital voice signal as a voice mail message to a number of individual voice mail boxes, comprising:

a. a server for accessing the Internet and downloading the digital information from the Internet;

b. a memory coupled to the server for storing the digital information;

c. a conversion module contained within the server for converting the information to a digital voice signal, and for converting the digital voice signal from a digital format to a proprietary digital voice signal;

d. a dedicated voice mail messaging system coupled to the conversion module for distributing the proprietary digital voice signal as a voice mail message to a number of individual voice mailboxes, wherein the proprietary digital voice signal is appropriately formatted to the dedicated telephone voice mail messaging system; and e. a software module contained within the server for issuing instructions to the dedicated voice mail messaging system, directing the dedicated system as to where to distribute the digital voice signal.

17. The Internet voice messaging apparatus, as claimed in claim 16, further comprising:

f. multiple telephonic voice mail systems which may be coupled to the dedicated telephonic voice mail system over a voice mail network.

18. The Internet voice messaging apparatus, as claimed in claim 17, wherein the software module within the server issues instructions to the multiple telephonic voice mail systems, instructing them to distribute the digital voice signal as a voice mail message to various users.

* * * * *

UNITED STATES PATENT AND TRADEMARK OFFICE
CERTIFICATE OF CORRECTION

PATENT NO. : 6,374,223 B1
DATED : April 16, 2002
INVENTOR(S) : Donaldson et al.

It is certified that error appears in the above-identified patent and that said Letters Patent is hereby corrected as shown below:

Column 5,
Line 30, replace "to it the Internet" with -- to the Internet --.

Column 10,
Line 14, element d, add -- file -- after "digital voice".

Signed and Sealed this

Eighth Day of October, 2002

Attest:

Attesting Officer

JAMES E. ROGAN
Director of the United States Patent and Trademark Office